(12) United States Patent
Shibata et al.

(10) Patent No.: US 7,887,400 B2
(45) Date of Patent: Feb. 15, 2011

(54) AIR CONDITIONING REGISTER

(75) Inventors: Minoru Shibata, Aichi-ken (JP);
Shigenori Shibata, Aichi-ken (JP);
Masaki Otake, Aichi-ken (JP); Takeshi Kaneko, Aichi-ken (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 296 days.

(21) Appl. No.: 11/902,367

(22) Filed: Sep. 20, 2007

(65) Prior Publication Data

US 2008/0081550 A1      Apr. 3, 2008

(30) Foreign Application Priority Data

Sep. 29, 2006   (JP)   ............... 2006-267549

(51) Int. Cl.
*B60H 1/34* (2006.01)
(52) U.S. Cl. ...................................... 454/155; 454/121
(58) Field of Classification Search .................. 454/155, 454/121
See application file for complete search history.

(56) References Cited

U.S. PATENT DOCUMENTS 4,377,107 A     3/1983   Izumi
6,800,023 B2 *  10/2004  Demerath .................... 454/155
2006/0223430 A1 * 10/2006  Shibata et al. ............... 454/155

FOREIGN PATENT DOCUMENTS

| JP | 2000-318438 | 11/2000 |
|----|-------------|---------|
| JP | A-2002-103954 | 4/2002 |
| JP | 2003-034136 | 2/2003 |
| JP | 2005-350029 | 12/2005 |

OTHER PUBLICATIONS

Notification of the Second Office Action issued from the Chinese Patent Office on Mar. 24, 2010 in the corresponding Chinese patent application No. 200710140667.1 (English translation thereof).

* cited by examiner

*Primary Examiner*—Steven B McAllister
*Assistant Examiner*—Samantha A Miller
(74) *Attorney, Agent, or Firm*—Posz Law Group, PLC

(57) ABSTRACT

A downstream side fin group is formed by a plurality of fins. Among these fins, end fins positioned at both ends in an arranging direction are arranged near second wall portions. Each end fin has an extension portion which is bent at upstream end thereof and extends toward the corresponding second wall portion. A space is provided near each second wall portion in the ventilation passage. Each space is closed by the corresponding extension portion at a time when the corresponding end fin is arranged at a maximum inclined position at which the end fin is most away from the second wall portion, and the extension portion enters the space at a time when the end fin is arranged at a different position from the maximum inclined position.

5 Claims, 10 Drawing Sheets

AIR CONDITIONING REGISTER

BACKGROUND OF THE INVENTION

The present invention relates to an air conditioning register that is used as an air outlet in an air conditioner, and regulates a direction of the air blown into a compartment.

In a vehicle such as a motor vehicle or the like, in order to display an operation of a device such as a navigation system, and a state of the device, there is a case that a display device is installed in a center cluster of an instrument panel. In recent years, in order to improve the visibility, the sizes of display portions (screens) of display devices have been enlarged. In the case that the display portion is arranged in a lower portion of the center cluster, the line of sight of the driver is shifted by a great distance when the driver shifts the line of sight from the windshield to the display portion. From this point of view, it is preferable that the display portion is arranged in an upper portion of the center cluster. For these reasons, a display portion 102 having an enlarged size is arranged in an upper portion of a center cluster 101 as shown by a solid line in FIG. 12, in recent years. A two-dot chain line in FIG. 12 shows the display portion 102 before being enlarged in size.

An air conditioning register 103 is arranged as an air outlet in an air conditioner in addition to the display portion 102, in an upper portion of the center cluster 101. Accordingly, since the display portion 102 occupies a large part in the upper portion of the center cluster 101, a place in which the air conditioning register 103 is arranged is limited. Therefore, in conventional, the air conditioning register 103 is arranged in both side portions of the display portion 102, as shown in FIG. 12.

However, since the air blowing from the air conditioning register 103 is directly applied to an arm of the driver gripping a steering wheel 104 in a layout of the air conditioning register 103 as mentioned above, there is a case that the driver feels bothered. Further, since the air blowing from the air conditioning register 103 is blocked by the arm of the driver, the air does not circulate within a passenger compartment. Accordingly, it is preferable that the air conditioning register 103 be arranged immediately above the display portion 102 in place of both side portions of the display portion 102.

However, if the conventional air conditioning register 103 is arranged immediately above the display portion 102 without any changes, the height of an instrument panel 100 including the center cluster 101 is increased in accordance with the arrangement. As a result, since an open feeling within the passenger compartment cannot be obtained, there is a case that an occupant feels oppressed and a confined. Accordingly, in order to suppress the height of the instrument panel 100, an air conditioning register 103 having a small vertical dimension have been installed above the display portion 102.

For example, Japanese Patent No. 3572480 discloses, as shown in FIG. 13, an air conditioning register 103 provided with a retainer 105, a fin group and a fin angle setting mechanism 114. The retainer 105 is constituted by a tubular body. A ventilation passage 106 is provided in an inner portion of the retainer 105. An air outlet 107 formed in a wide rectangular shape is provided in a downstream end of the retainer 105. In the retainer 105, a pair of side walls corresponding to a short side A of the air outlet 107 among four wall portions surrounding the ventilation passage 106 form a first wall portion 108, and an upper wall and a lower wall corresponding to a long side B form a second wall portion 109.

The fin group is constituted by three fins 111, 112 and 113 extending along the long side B of the air outlet within the retainer 105. The fins 111 to 113 are arranged along the short side A of the air outlet and spaced away from each other. Each of the fins 111 to 113 is supported at both ends so as to be tiltable with respect to the first wall portion 108.

Each of the fins 111 and 113 positioned in both ends in the arranging direction of a plurality of fins constituting the fin group is arranged so as to come close to the second wall portion 109. Each of the fins 111 and 113 is constituted by two members arranged along the ventilation passage 106. In other words, the fin 111 is constituted by an upstream piece 111a and a downstream piece 111b, and the fin 113 is constituted by an upstream piece 113a and a downstream piece 113b.

The fin angle setting mechanism 114 sets an angle, that is, an inclination of each of the upstream pieces 111a and 113a and the downstream pieces 111b and 113b of each of the fins 111 and 113. The fin angle setting mechanism 114 holds the downstream piece 111b (113b) of the fin 111 (113) positioned in a tilting direction of the fin 112 in a direction parallel to the second wall portion 109, and tilts the upstream piece 111a (113a) in the same direction as the fin 112 in synchronous with the tilting motion of the fin 112, at a time when the fin 112 is tilted. Further, the fin angle setting mechanism 114 tilts the downstream piece 113b (111b) of the fin 113 (111) positioned in an opposite side to the tilting direction of the fin 112 in the same direction as the fin 112 in synchronous with the tilting motion of the fin 112, and holds the upstream piece 113a (111a) in a direction parallel to the second wall portion 109.

For example, as shown in FIG. 14, in the case that the fin 112 is tilted so as to be higher toward a downstream end, the fin angle setting mechanism 114 holds the downstream piece 111b of the fin 111 in a direction parallel to the second wall portion 109, and tilts the upstream piece 111a in the same direction as the fin 112. Further, the fin angle setting mechanism 114 tilts the downstream piece 113b of the fin 113 in the same direction as the fin 112, and holds the upstream piece 113a in the direction parallel to the second wall portion 109.

In accordance with the air conditioning register 103 described in Japanese Patent No. 3572480, it is possible to resolve a problem generated in the case of simply making the air conditioning register thin, that is, a problem that an interval between the fins 111 to 113 becomes narrow and it is hard to secure an air flow passage. However, as long as the air conditioning register 103 described in Japanese Patent No. 3572480 employs the structure mentioned above as the fin angle setting mechanism 114, the upstream piece 111a (113a) of the fin 111 (113) positioned in the tilting direction of the intermediate fin 112 is tilted in the same direction as the fin 112 in synchronous with the tilting motion of the fin 112. In accordance with the tilting motion, a space 115 in which the height is enlarged toward an upstream end is formed between the second wall portion 109 and the upstream piece 111a (113a), as shown by a two-dot chain line in FIG. 14. Since the space 115 forms an air drift, the air enters the space 115 so as to form eddy currents. As a result, there is a risk that a noise is generated. Further, there is a risk that a pressure loss is enlarged at a degree that the air flows into the space 115.

SUMMARY OF THE INVENTION

An objective of the present invention is to provide an air conditioning register which suppresses the generation of noise and an increase of a pressure loss, and achieves a thin structure.

To achieve the foregoing objective and in accordance with one aspect of the present invention, an air conditioning register for regulating a direction of an air blown from an air conditioner into a passenger compartment of a vehicle is provided. The register includes a tubular retainer, a ventilation passage, and a rectangular opening. The ventilation passage is provided within the retainer and circulates the air. The rectangular opening is provided in a downstream end of the retainer for blowing off the air. The retainer is constituted by four wall portions surrounding the ventilation passage. Two of the wall portions that correspond to short sides of the opening form first wall portions, and the other two wall portions that correspond to long sides of the opening form second wall portions. At least three plate-like fins are provided within the retainer and extend along the long sides of the opening. The fins are arranged along the short sides of the opening and away from each other. A plurality of support shafts are each provided in one of the fins. Each support shaft supports the corresponding fin so as to be tiltable with respect to the first wall portion. Each of the end fins positioned in both ends in an arranging direction of the plurality of fins is arranged near the second wall portion. Each of the fins has an extension portion which is bent at an upstream end thereof, and extends toward the corresponding second wall portion. A space is provided near each second wall portion in the ventilation passage. The space is closed by the corresponding extension portion when the corresponding end fin is arranged at a maximum inclined position at which the end fin is most separated from the second wall portion. The extension portion enters the space when the end fin is arranged at a position different from the maximum inclined position.

DETAILED DESCRIPTION OF THE PREFERRED EMBODIMENTS

First Embodiment

A description will be given of a first embodiment obtained by embodying the present invention with reference to FIGS. 1 to 7.

Figure 1:
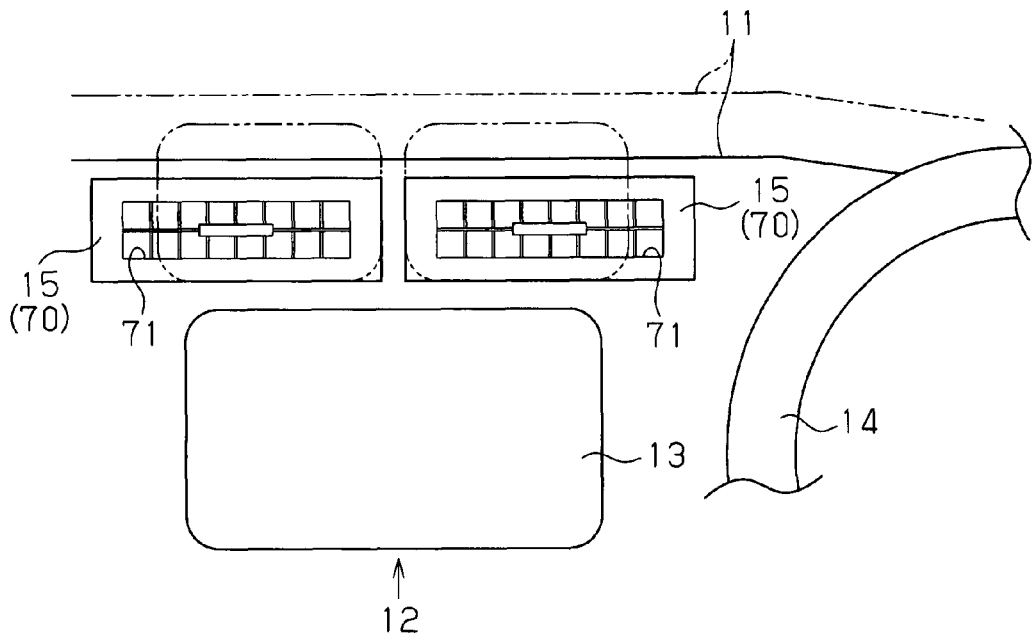
FIG. 1 is a partial front elevational view showing a center cluster in which an air conditioning register in accordance with a first embodiment of the present invention is incorporated, and a peripheral structure of the same.

As shown in FIG. 1, within a passenger compartment, an instrument panel 11 is provided in front of a driver's seat and a front passenger seat. In the instrument panel 11, a center cluster 12 is provided in a center in a vehicle width direction. A display portion 13 of a display device in a navigation system is attached to an upper portion of the center cluster 12. The display portion 13 is positioned in a left front side of a handle of a steering apparatus, that is, a steering wheel 14.

A pair of air conditioning registers 15 are incorporated immediately above the display portion 13 in an upper portion of the center cluster 12, in a state of being arranged in the vehicle width direction. The air conditioning register 15 regulates a direction of an air blown into the passenger compartment from the air conditioner, and shuts off the blow of the air.

Both the air conditioning registers 15 are arranged at the positions mentioned above because the following problems are generated in the case that they are arranged in both side portions of the display portion 13. (i) Since the air blown from the right air conditioning register is directly applied to an arm of a driver gripping the steering wheel 14, the driver feels a botheration. (ii) Since the air flow is prevented by the arm of the driver, the air blowoff from the air conditioning register is hard to be circulated within the passenger compartment.

Accordingly, in order to suppress the height of the instrument panel 11 including the center cluster 12, in more detail, in order to inhibit the height of the instrument panel 11 from being increased in accordance with the incorporation of the air conditioning register 15, the thin type air conditioning register 15 having a low height is used.

Figure 3:
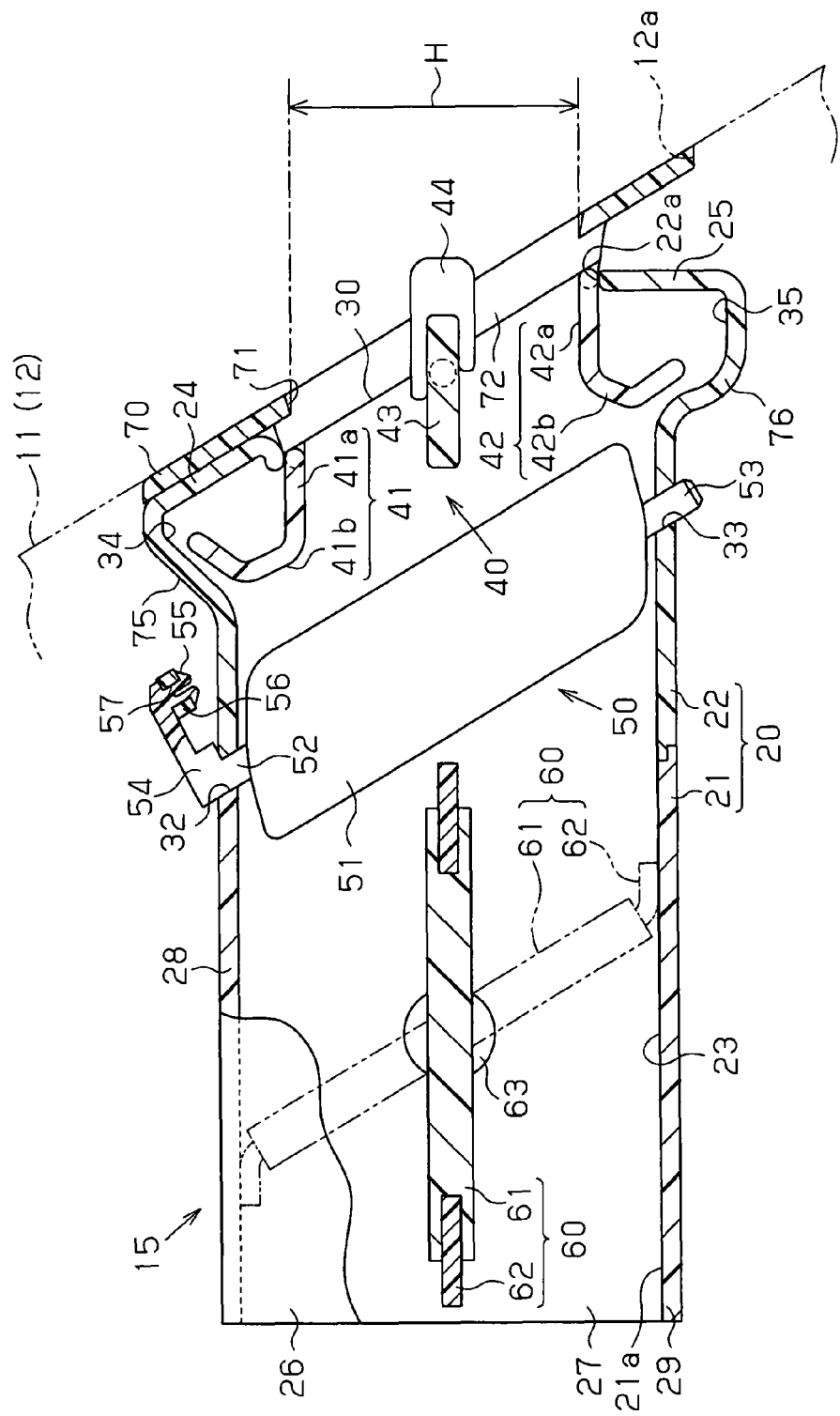
FIG. 3 is a cross-sectional view taken along line 3-3 in FIG. 2.

As shown in FIG. 3, each of the air conditioning registers 15 includes a retainer 20, a downstream side fin group 40, an upstream side fin group 50, a damper 60, and a cover 70.

<Retainer 20>

Figure 4:
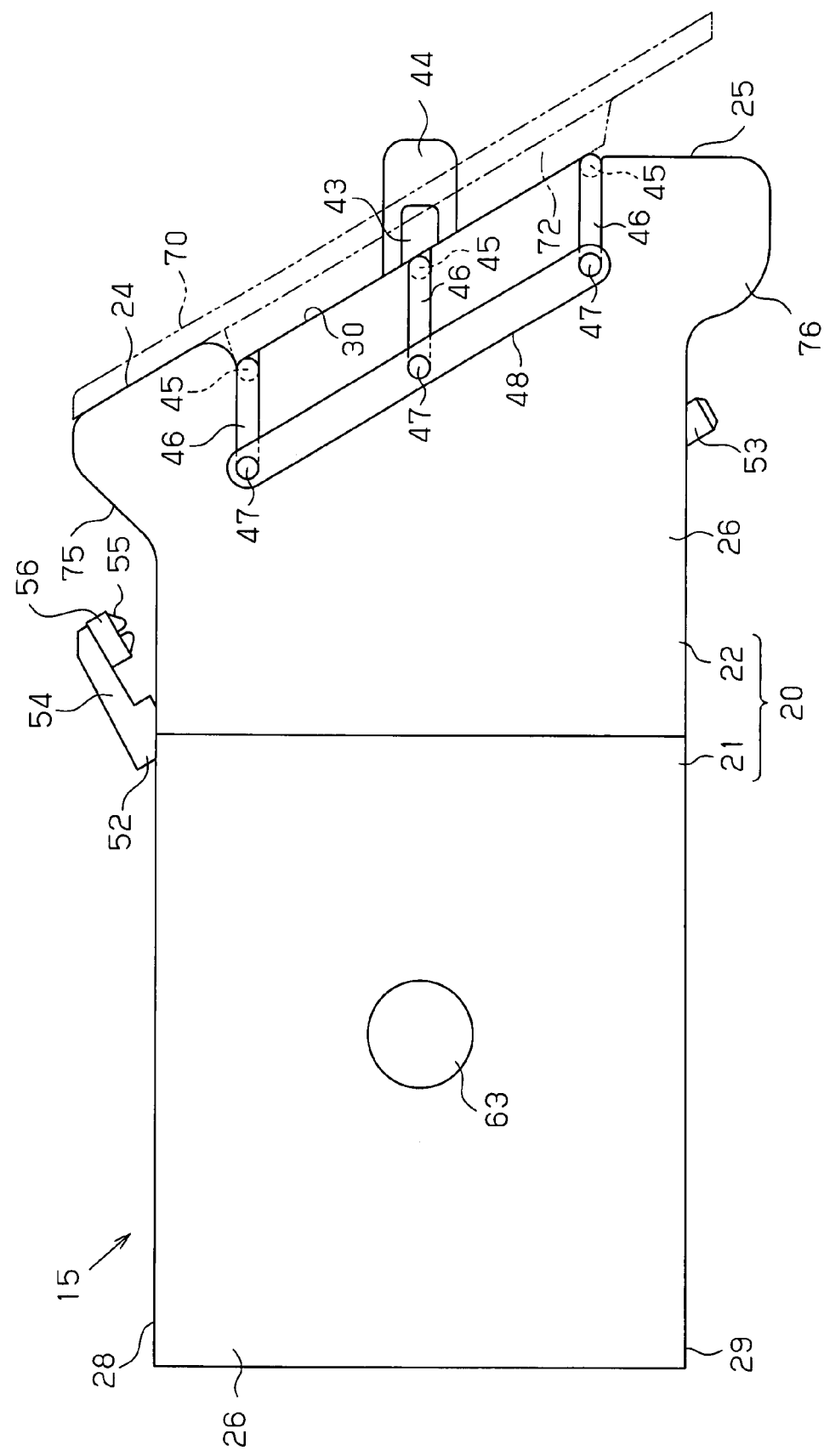
FIG. 4 is a side elevational view showing a state in which a cover is detached from the air conditioning register.

As shown in FIGS. 3 and 4, the retainer 20 is structured such as to connect a ventilation duct (not shown) of the air conditioner, and an opening 12a provided in the center cluster 12. The retainer 20 is provided with an upstream side member 21 and a downstream side member 22. Each of the upstream side member 21 and the downstream side member 22 is constituted by an approximately square tubular body provided with an opening in both ends. The retainer 20 provided with a ventilation passage 23 in an inner portion is formed by arranging the upstream side member 21 and the downstream side member 22 in series so as to couple with each other.

An upstream side opening 21a in the upstream side member 21 is an introduction port of the air fed out from the ventilation duct, and has the same horizontal cross-sectional shape as the ventilation passage 23 within the retainer 20.

In contrast, a downstream side opening 22a in the downstream side member 22 has a smaller height than a horizontal cross-sectional surface of the ventilation passage 23. Plate-like portions 24 and 25 are respectively formed in an upper portion and a lower portion in a downstream end of the downstream side member 22. The plate-like portion 24 in the upper side is inclined in such a manner as to be away from the driver's seat and the assistant driver's seat to a front side toward an upper side. The plate-like portion 25 in the lower side extends along an approximately vertical direction. The opening 22a is provided in a portion sandwiched by the plate-like portions 24 and 25.

Figure 2:
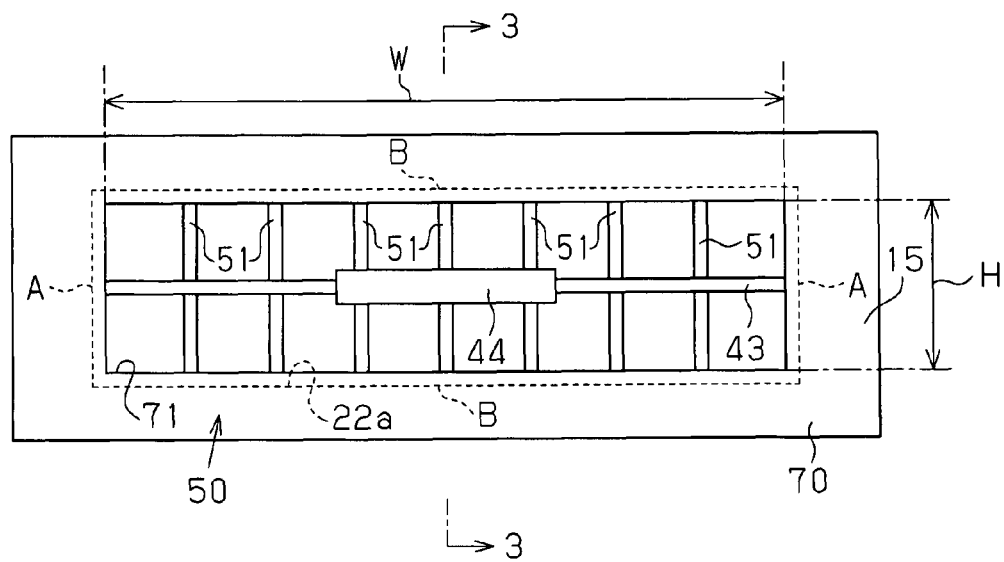
FIG. 2 is an enlarged front elevational view showing the air conditioning register.

The ventilation passage 23 is surrounded by four wall portions forming the retainer 20. In order to differentiate these four wall portions, the wall portions corresponding to a short side A of the opening 22a in FIG. 2 are referred to as first wall portions 26 and 27, and the wall portions corresponding to a long side B of the opening 22a are referred to as second wall portions 28 and 29. In a first embodiment in which a horizontal cross section of the ventilation passage 23 is formed in a wide rectangular shape, two wall portions opposing each other along the vehicle width direction are the first wall portions 26 and 27, and two wall portions opposing each other along the vertical direction are the second wall portions 28 and 29.

Figure 5:
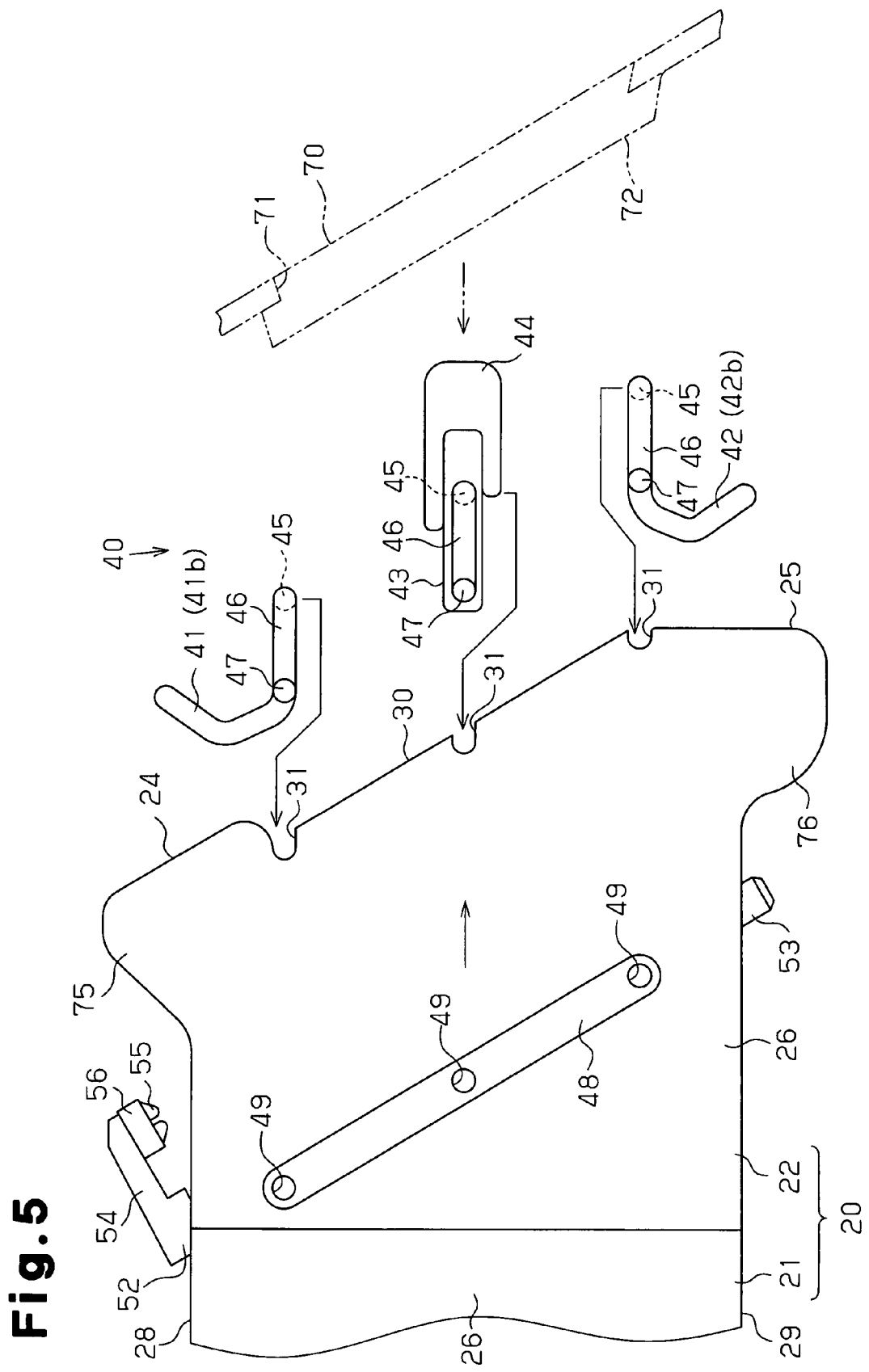
FIG. 5 is a partial side elevational view showing a state before attaching an end fin and an intermediate fin to a retainer.

As shown in FIGS. 3 and 5, in a downstream end edge 30 of both the first wall portions 26 and 27, a portion corresponding to the opening 22a is inclined in such a manner as to be away from the driver's seat and the assistant driver's seat to a front side toward an upper side. In each of the first wall portions 26 and 27, three bearing recesses 31 are provided in the inclined downstream end edge 30 so as to be spaced at a uniform interval along a vertical direction.

A plurality of bearing portions 32 are provided in a coupling portion between the upstream side member 21 and an upper end of the downstream side member 22 so as to be spaced at a uniform interval along the long side B of the opening 22a. In correspondence to this, a bearing portion 33 constituted by the same number of round holes as the bearing portion 32 is placed in the second wall portion 29 of the downstream side member 22 at a uniform interval along the long side B of the opening 22a.

<Downstream Side Fin Group 40>

The downstream side fin group 40 is provided near the opening 22a of the downstream side member 22. The downstream side fin group 40 is constituted by three elongated downstream side fins extending along the long side B of the opening 22a. Each of the downstream side fins is formed in a flat elongated plate shape having a predetermined width. Each of the downstream side fins is arranged along the short side A of the opening 22a, in a state of being away from each other. The number of the downstream side fins is set to three, because an air flow passage is secured by making the interval between the downstream side fins as large as possible, even in the ventilation passage 23 having the small height.

In this case, in order to differentiate three downstream side fins, the fins positioned at both ends in an arranging direction of a plurality of fins, that is, an upper end and a lower end of the downstream side fin group are referred to as end fins 41 and 42, and the fin positioned in the center of the downstream side fin group is referred to as an intermediate fin 43. The end fin 41 is arranged near the second wall portion 28, and the end fin 42 is arranged near the second wall portion 29. The intermediate fin 43 is arranged in the middle between the end fins 41 and 42. An operation knob 44 having a larger thickness than the intermediate fin 43 is integrally formed in an intermediate portion of the intermediate fin 43 (refer to FIG. 2).

As shown in FIGS. 4 and 5, each of the end fins 41 and 42 and the intermediate fin 43 has a support shaft 45 in a downstream end of the ventilation passage 23 in both end surfaces thereof. The support shafts 45 are rotatably engaged with the bearing recess 31 mentioned above. Accordingly, each of the end fins 41 and 42 and the intermediate fin 43 is tiltable along the short side A of the opening 22a, that is, along a vertical direction, around the support shafts 45.

In the end fins 41 and 42 and the intermediate fin 43, at least one support shaft 45 protrudes further outward than the corresponding first wall portion 26. An arm 46 is integrally formed in each of the end portions of the protruding support shafts 45. Each of the arms 46 extends to an upstream side starting from the support shaft 45, and has a coupling protrusion 47 in the extending end portion.

Each of the arms 46 is coupled by a coupling rod 48 formed in a flat rod shape. A plurality of holes 49 are provided in the coupling rod 48 at such an interval that the end fins 41 and 42 and the intermediate fin 43 are arranged. The coupling protrusion 47 of each of the arms 46 is rotatably engaged with each of the holes 49.

<Upstream Side Fin Group 50>

As shown in FIGS. 2 and 3, the upstream side fin group 50 is provided in an upstream side of the downstream side fin group 40 within the retainer 20. The upstream side fin group 50 is constituted by a plurality of upstream side fins 51 extending along the short side A of the opening 22a. These upstream side fins 51 are arranged along the long side B of the opening 22a in a state of being away from each other in parallel. Each of the upstream side fins 51 is constituted by a thin plate formed in an approximately parallelogram shape, and is inclined so as to be away from the driver's seat and the assistant driver's seat to a front side toward an upper end (refer to FIG. 3).

Support shafts 52 and 53 are provided in both end surfaces of each of the upstream side fins 51 in a state of being inclined. The upper support shaft 52 is rotatably engaged with the bearing portion 32, and the lower support shaft 53 is rotatably engaged with the bearing portion 33. Accordingly, each of the upstream side fins 51 is tiltable along the long side B of the opening 22a, that is, the vehicle width direction around each of the support shafts 52 and 53.

In each of the upstream side fins 51, the support shaft 52 provided in the upper end thereof protrudes further upward than the corresponding upper second wall portion 28. An arm 54 is formed in an end portion of each of the support shafts 52. Each of the arms 54 extends to a downstream side starting from each of the support shafts 52, and has a coupling protrusion 55 in the extending end portion thereof.

Each of the arms 54 is coupled by a coupling rod 56 formed in a flat rod shape. A plurality of holes 57 are provided in the coupling rod 56 at such an interval that the upstream side fins 51 are arranged. The coupling protrusion 55 of each of the arms 54 is rotatably engaged with each of the holes 57.

<Damper 60>

The damper 60 is provided for opening and closing the ventilation passage 23, and is arranged in an upstream side of the upstream side fin group 50 within the retainer 20. The damper 60 is provided with a damper plate 61 having an approximately rectangular shaped plane, and an annular seal member 62 installed to an outer periphery edge of the damper plate 61.

A support shaft 63 is provided in each of both side portions of the damper plate 61. The damper plate 61 is supported to the first wall portions 26 and 27 via each of the support shafts 63. The damper plate 61 is rotatable between a position (a position shown by a solid line in FIG. 3) which is parallel to the second wall portions 28 and 29, and an inclined position (a position shown by a solid line in FIG. 3) bringing the seal member 62 into contact with the second wall portions 28 and 29.

<Cover 70>

The cover 70 constructs an ornamental surface of the air conditioning register 15. The cover 70 has an opening 71 which is smaller than the opening 22a in the downstream side of the retainer 20. The opening 71 constructs an air outlet of the air conditioning register 15. In the first embodiment, the height H of the opening 71 (the air outlet) is set to 30 mm, and a width W thereof is set to 120 mm.

As shown by a two-dot chain line in FIG. 5, the cover 70 is provided with a locking portion 72 protruding to an upstream side. The locking portion 72 locks the support shaft 45 engaged with the bearing recess 31 so as to be prevented from falling off as well as closing the bearing recess 31 of each of the first wall portions 26 and 27. The cover 70 is provided with an attaching portion (not shown). The cover 70 is installed to the retainer 20 from the downstream side, in the attaching portion.

The air conditioning register 15 is provided with an upstream side fin operation portion for tilting any one of the upstream side fins 51 in the upstream side fin group 50, and a damper operation portion for rotating the damper 60, which are not illustrated.

In the air conditioning register having the structure mentioned above, the damper 60 is rotated around the support shaft 63 as shown in FIG. 3 by operating the damper operation portion. In the case that the damper 60 is rotated so as to be arranged in parallel to the second wall portions 28 and 29, the ventilation passage 23 is fully opened. In the case that the damper 60 is rotated so as to be arranged in a state of bringing the seal member 62 into contact with the second wall portions 28 and 29, the ventilation passage 23 is closed, and the distribution of the air is shut off.

Further, if the upstream side fin operating portion is operated, and any one upstream side fin 51 in the upstream side fin group 50 is tilted along the long side B of the opening 22a around the support shafts 52 and 53, the motion is transmitted to all the other upstream side fins 51 via the coupling protrusion 55, the arm 54 and the coupling rod 56. Accordingly, all the upstream side fins 51 are synchronously tilted. The air flows along the tilted upstream side fin 51 at a time of passing through the upstream side fin group 50, and is changed its direction so as to be blown into the passenger compartment from the opening 71.

As shown in FIGS. 3 and 4, if the operation knob 44 is gripped and is displaced along the short side A of the opening 22a, the intermediate fin 43 is tilted in the same direction as the operation knob 44 around the support shaft 45 in both ends thereof. The motion of the intermediate fin 43 is transmitted to the end fins 41 and 42 via the coupling protrusion 47, the arm 46 and the coupling rod 48. In accordance with this transmission, the intermediate fin 43 and the end fins 41 and 42 are synchronously tilted. The air flows along the tilted intermediate fin 43 and the end fins 41 and 42 at a time of passing through the downstream side fin group 40, and is changed its direction so as to be blown from the opening 71.

Next, a description will be given of a feature portion of the first embodiment. The feature portion is roughly constituted by the following three items (a) to (c).

(a) Each of the end fins 41 and 42 positioned at the upper end and the lower end of the downstream side fin group 40 are respectively arranged near the second wall portions 28 and 29. In more detail, as shown in FIG. 5, three bearing recesses 31 are provided in the downstream end edge 30 of each of the first wall portions 26 and 27, as mentioned above. Further, the bearing recess 31 positioned at a highest portion is provided so as to come close to the upper plate-like portion 24, and the bearing recess 31 positioned at the lowest portion is provided so as to come close to the plate-like portion 25. Further, the support shaft 45 of the end fin 41 is engaged with the bearing recess 31 in a highest stage, and the support shaft 45 of the end fin 42 is engaged with the bearing recess 31 in the lowest stage.

(b) As shown in FIG. 3, the end fin 41 is integrally provided with an extension portion 41b which is bent in the upstream end and further extends toward the second wall portion 28. In the same manner, the end fin 42 is integrally provided with an extension portion 42b which is bent in the upstream end and further extends toward the second wall portion 29. In each of the end fins 41 and 42, in order to differentiate the extension portions 41b and 42b from the other flat plate portions, the latter portions are respectively referred to as main body portions 41a and 42a. Each of the extension portions 41b and 42b extends along the long side B of the opening 22a, and is formed over a whole length of each of the end fins 41 and 42. Each of the extension portions 41b and 42b is bent in a connection portion to each of the main body portions 41a and 42a, and is bent in such a manner as to protrude an intermediate portion of each of the extension portions 41b and 42b to an upstream side.

(c) A space 34 is provided near the second wall portion 28 in the ventilation passage 23. The space 34 is closed by the extension portion 41b at a time when the end fin 41 is tilted most largely downward in which the end fin 41 is separated from the second wall portion 28, that is, at a time when the end fin 41 is arranged at a most inclined position at which the end fin 41 is separated from the second wall portion 28 to the maximum (refer to FIG. 6). Further, when the end fin 41 is tilted at a "different inclination" from the inclination mentioned above, that is, when the end fin 41 is arranged at a different position from the maximum inclined position, the extension portion 41b of the end fin 41 enters the space 34. The "different inclination" includes a inclination at a time when the main body portion 41a of the end fin 41 becomes in parallel to the second wall portion 28 (refer to FIG. 3), and an inclination at a time when the main body portion 41a is tilted upward in such a manner as to come close to the second wall portion 28 (refer to FIG. 7). In order to form the space 34, in the first embodiment, a bulge portion 75 bulging upward corresponding to an outer side of the ventilation passage 23 than the other portions is provided in the downstream end of the second wall portion 28. In other words, an internal space of the bulge portion 75 corresponds to the space 34.

In the same manner, a space 35 is provided near the second wall portion 29 in the ventilation passage 23. The space 35 is closed by the extension portion 42b at a time when the end fin 42 is tilted most largely upward in which the end fin 42 is separated from the second wall portion 29, that is, at a time when the end fin 42 is arranged at a most inclined position at which the end fin 42 is separated from the second wall portion 29 to the maximum (refer to FIG. 7). Further, when the end fin 42 is tilted at a "different inclination" from the inclination mentioned above, that is, when the end fin 42 is arranged at a different position from the maximum inclined position, the extension portion 42b of the end fin 42 enters the space 35. The "different inclination" includes a inclination at a time when the main body portion 42a of the end fin 42 becomes in parallel to the second wall portion 29 (refer to FIG. 3), and an inclination at a time when the main body portion 42a is tilted downward in such a manner as to come close to the second wall portion 29 (refer to FIG. 6). In order to form the space 35, in the first embodiment, a bulge portion 76 bulging downward corresponding to an outer side of the ventilation passage 23 than the other portions is provided in the downstream end of the second wall portion 29. An internal space of the bulge portion 76 corresponds to the space 35.

Next, a description will be given of an operation of the air conditioning register 15 in accordance with the first embodiment.

FIGS. 3 and 4 show a state in which the intermediate fin 43 is arranged in parallel to the second wall portions 28 and 29 by operating the operation knob 44. The air flowing through the intermediate portion in the height direction in the ventilation passage 23 flows along the intermediate fin 43, and is blown off straight from the opening 71.

The main body portion 41a of the end fin 41 is parallel to the intermediate fin 43. At this time, the upper portion of the extension portion 41b has entered the space 34, and is close to an inner wall surface of the bulge portion 75. Accordingly, the air flowing through the upper portion of the ventilation passage 23 is introduced diagonally downward by the extension portion 41b while hardly flowing into the space 34, thereafter flows along the main body portion 41a, and is blown off straight from the opening 71.

The main body portion 42a of the end fin 42 is parallel to the intermediate fin 43. The lower portion of the extension portion 42b has entered the space 35, and is close to an inner wall surface of the bulge portion 76. Accordingly, the air flowing through the lower portion of the ventilation passage 23 is introduced diagonally upward by the extension portion 42b while hardly flowing into the space 35, thereafter flows along the main body portion 42a, and is blown off straight from the opening 71.

Figure 6:
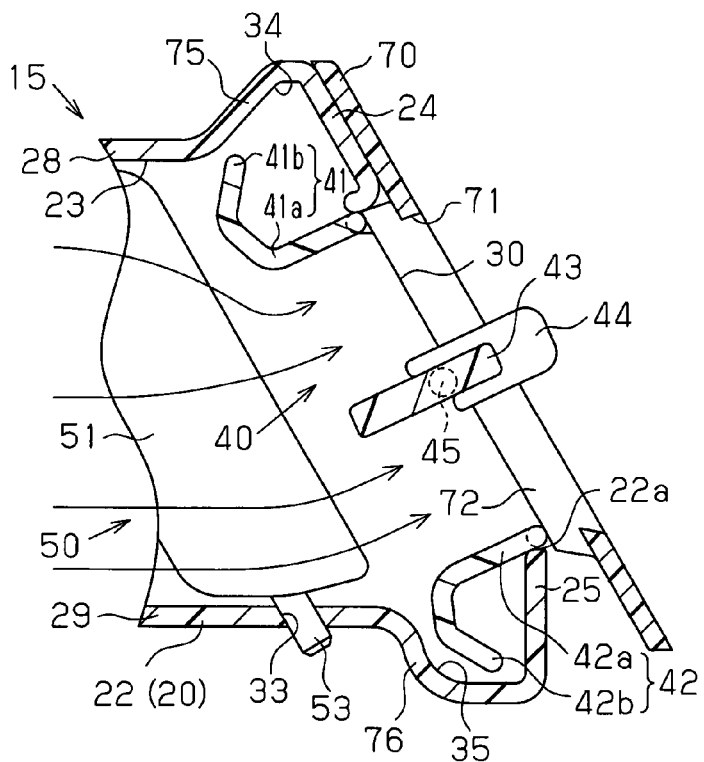
FIG. 6 is a partial side cross-sectional view showing the air conditioning register at a time of operating an operation knob upward.

FIG. 6 shows a state in which the intermediate fin 43 is rotated in a counterclockwise direction around the support shaft 45 by pushing up the operation knob 44. In this state, the intermediate fin 43 is tilted in such a manner as to become higher toward the downstream end, that is, such that the downstream end comes to the upper side. Accordingly, the air flowing through the intermediate portion in the height direction in the ventilation passage 23 flows along the intermediate fin 43, and is blown off diagonally upward from the opening 71.

The main body portion 41a of the end fin 41 is parallel to the intermediate fin 43. At this time, the upper end portion of the extension portion 41b is positioned in a boundary portion between the space 34 and the ventilation passage 23, and the space 34 is closed by the extension portion 41b. Accordingly, the air flowing through the upper portion of the ventilation passage 23 is introduced diagonally downward by the extension portion 41b while hardly flowing into the space 34, thereafter flows along the main body portion 41a, and is blown off diagonally upward from the opening 71.

The main body portion 42a of the end fin 42 is parallel to the intermediate fin 43. At this time, the lower end portion of the extension portion 42b has gotten deep into the space 35. Accordingly, the air flowing through the lower portion of the ventilation passage 23 flows along the extension portion 42b and the main body portion 42a while hardly flowing into the space 35, and is blown off diagonally upward from the opening 71.

Figure 7:
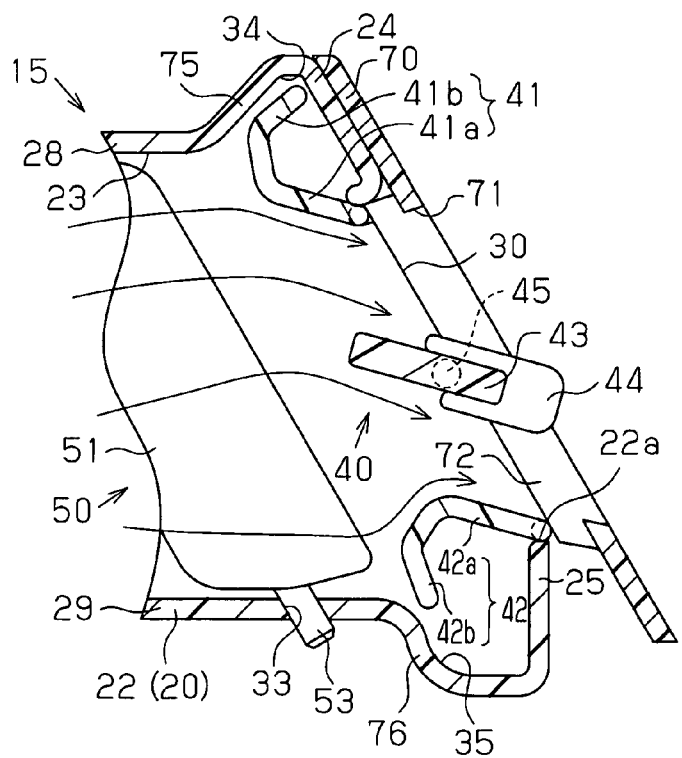
FIG. 7 is a partial side cross-sectional view showing the air conditioning register at a time of operating the operation knob downward.

FIG. 7 shows a state in which the intermediate fin 43 is rotated in a clockwise direction around the support shaft 45 by pushing down the operation knob 44. In this state, the intermediate fin 43 is tilted in such a manner as to become lower toward the downstream end, that is, such that the downstream end comes to the lower side. Accordingly, the air flowing through the intermediate portion in the height direction in the ventilation passage 23 flows along the intermediate fin 43, and is blown off diagonally downward from the opening 71.

The main body portion 41a of the end fin 41 is parallel to the intermediate fin 43. At this time, the upper end portion of the extension portion 41b has gotten deep into the space 34. Accordingly, the air flowing through the lower portion of the ventilation passage 23 flows along the main body portion 41a while hardly flowing into the space 34, and is blown off diagonally downward from the opening 71.

The main body portion 42a of the end fin 42 is parallel to the intermediate fin 43. At this time, the lower end portion of the extension portion 42b is positioned in a boundary portion between the space 35 and the ventilation passage 23, and the space 35 is closed by the extension portion 42b. Accordingly, the air flowing through the lower portion of the ventilation passage 23 flows along the extension portion 42b and the main body portion 42a while hardly flowing into the space 35, and is blown off diagonally downward from the opening 71.

In the case that the support shaft 45 is provided at the different position from the downstream ends of the intermediate fin 43 and the end fins 41 and 42 at a time of the tilting motion mentioned above, the section downstream of the support shaft 45 is displaced at a time of tilting the intermediate fin 43 and the end fins 41 and 42. Accordingly, an outer appearance is not good. However, in the first embodiment, the support shaft 45 is provided in the downstream ends of the intermediate fin 43 and the end fins 41 and 42. Accordingly, even if the intermediate fin 43 and the end fins 41 and 42 are tilted, the downstream side portion does not displace than the support shaft 45.

In accordance with the first embodiment in detail mentioned above, the following advantages can be obtained.

(1) The end fins 41 and 42 positioned at the upper end and the lower end of the downstream side fin group 40 are arranged near the second wall portions 28 and 29. Accordingly, even in the thin type retainer 20 in which the size in the arranging direction of the downstream side fins is small, it is possible to enlarge the interval between the adjacent downstream side fins in comparison with the case that the end fins 41 and 42 are arranged so as to be away from the second wall portions 28 and 29. Therefore, it is possible to easily secure the flow passage of the air between the downstream side fins.

Particularly, in the first embodiment, the downstream side fin group 40 is constructed by a pair of end fins 41 and 42, and one intermediate fin 43 arranged therebetween. In other words, it is possible to efficiently enlarge the interval between the adjacent downstream side fins by setting the number of the fins to three corresponding to the minimum number.

(2) It is possible to suppress the height of the instrument panel 11 including the center cluster 12 by incorporating the thin type air conditioning register 15 as mentioned in the item (1) (refer to the solid line in FIG. 1). Accordingly, it is possible to resolve the problem caused by the instrument panel 11 (the center cluster 12) becoming higher as shown by the two-dot chain line in FIG. 1, and the driver does not feel oppressed or any confined. Further, since the opening 71 for blowing off the air is arranged in the upper portion of the display portion 13 of the display device, it is possible to inhibit the air from directly coming into contact with the arm of the driver.

(3) Normally, the air flowing through the ventilation passage is blown from the opening after passing through the flow passage between the adjacent fins. The direction in which the air flows is determined by the fins at the time of passing the flow passage. In the case that the fins are parallel to the second wall portion, the air flows between the adjacent fins along the direction which is parallel to the second wall portion. In other words, the air flows between the adjacent fins while maintaining the direction in the upstream side of the fin group, and is blown off straight from the opening. In contrast, if the fins are tilted and are arranged diagonally with respect to the second wall portion, the direction in which the air flows is changed in the process of flowing between the adjacent fins. As mentioned above, the air is blown in the direction changed by the fins from the opening.

In the case that the whole of the end fin is formed in the flat plate shape, the space is generated between the end fin and the second wall portion at a time when the end fin is tilted in such a manner as to move away from the second wall portion, and the air flows into the space, whereby the noise is generated, or the pressure loss is increased.

Accordingly, in the present embodiment, the end fins 41 and 42 are respectively provided with the extension portions 41b and 42b which are bent at the upstream ends of the main body portions 41a and 42a thereof and extend toward the second wall portions 28 and 29. In addition, the spaces 34 and 35 are respectively provided near the second wall portions 28 and 29 in the ventilation passage 23. In the case that the respective end fins 41 and 42 are arranged at the maximum inclined positions which are most away from the second wall portions 28 and 29, the respective spaces 34 and 35 are closed by the extension portions 41b and 42b of the respective end fins 41 and 42. Further, in the case that the respective end fins 41 and 42 are arranged at the different position from the maximum inclined position, the extension portions 41b and 42b of the respective fins 41 and 42 enter the spaces 34 and 35.

Accordingly, it is possible to prevent a space from being create between the respective end fins 41 and 42, and the respective second wall portions 28 and 29, in the case that the main body portions 41a and 42a of the end fins 41 and 42 arranged in parallel to the second wall portions 28 and 29 are respectively tilted in the directions away from the respective second wall portions 28 and 29. Accordingly, it is possible to inhibit the noise caused by the space from being generated, and inhibit the pressure loss from being increased.

It is possible to avoid the contact between the extension portions 41b and 42b of the respective fins 41 and 42 and the respective second wall portions 28 and 29, by the spaces 34 and 35 as mentioned above, at a time when the main body portions 41a and 42a of the respective end fins 41 and 42 are tilted toward the respective second wall portions 28 and 29.

Figure 14:
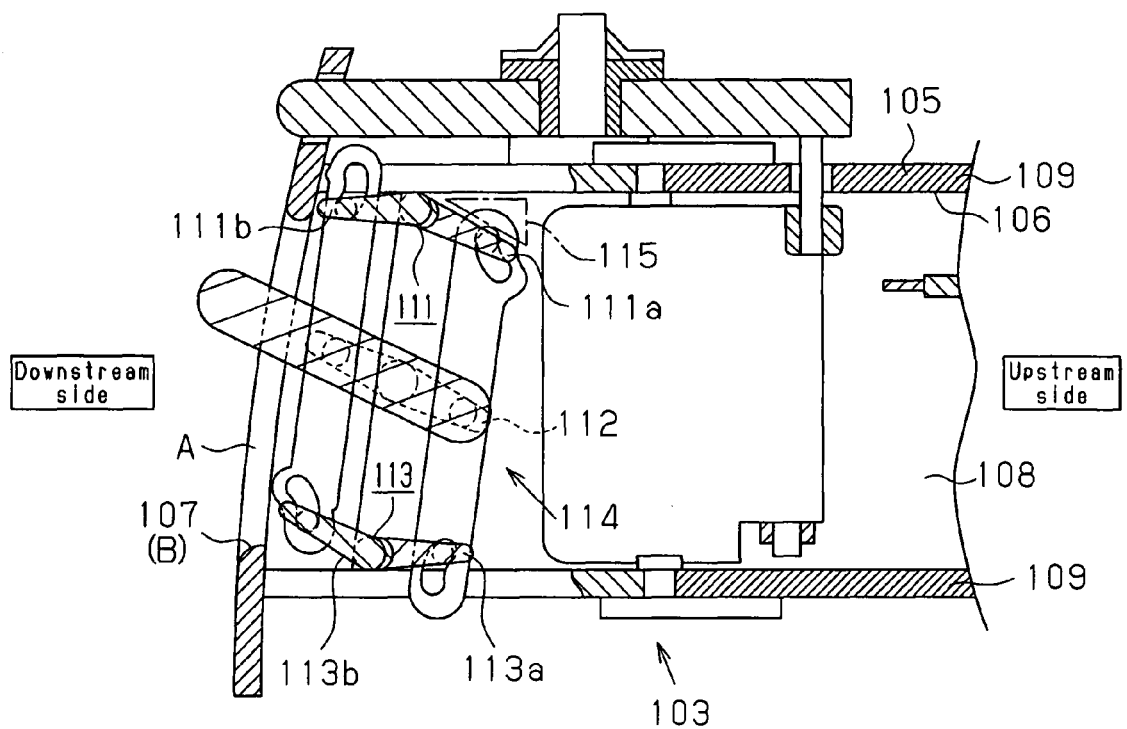
FIG. 14 is a partial side cross-sectional view showing an air conditioning register at a time of tilting an intermediate fin so as to become higher toward a downstream end thereof.

(4) In the conventional air conditioning register 103, as shown in FIG. 14, the downstream piece 111b (113b) of the fin 111 (113) positioned in the tilting direction of the fin 112 is held in the direction which is parallel to the ventilation passage 106. Accordingly, the air flowing near the fin 111 (113) is blown off straight from the air outlet 107. In the case that the passenger tilts the intermediate fin 112 in such a manner as to become higher toward the downstream end, for example, as shown in FIG. 14, in order to change the blowing off direction of the air, the wind is blown from the upper portion of the air outlet 107 of the air conditioning register 103, in the different direction from the direction in which the fin 112 is inclined. In contrast, the same phenomenon is generated even in the case of tilting in such a manner that the downstream end of the fin 112 is directed to the lower side.

In this regard, the respective end fins 41 and 42 are provided with the flat plate shaped main body portions 41a and 42a in the downstream side thereof, in the first embodiment. Further, the main body portions 41a and 42a of the respective end fins 41 and 42 are arranged so as to be always in parallel to the intermediate fin 43 by the coupling rod 56 and the link mechanism regardless of the angle of inclination of the intermediate fin 43. Accordingly, it is possible to blow off the air flowing through the upper portion and the lower portion of the ventilation passage 23 in the same direction as the air flowing through the intermediate portion in the height direction of the ventilation passage 23.

(5) Each of the end fins 41 and 42 and the intermediate fin 43 are respectively supported so as to be tiltable with respect to the first wall portions 26 and 27 via the support shaft 45 provided in the downstream end. In this case, in each of the end fins 41 and 42 and the intermediate fin 43, since the section downstream of support shaft 45 is not displaced even if they are tilted, it is possible to improve an outer appearance.

(6) The cover 70 having the opening 71 smaller than the opening 22a of the retainer 20 is installed to the retainer 20 from the downstream side thereof. In this case, it is possible to conceal the downstream end of each of the end fins 41 and 42 in addition to the opening 22a of the retainer 20 by the cover 70. Accordingly, the ornamentality in the passenger compartment is further improved.

Second Embodiment

Next, a description will be given of a second embodiment according to the present invention with reference to FIGS. 8 to 11, focusing on different points from the first embodiment.

Figure 8:
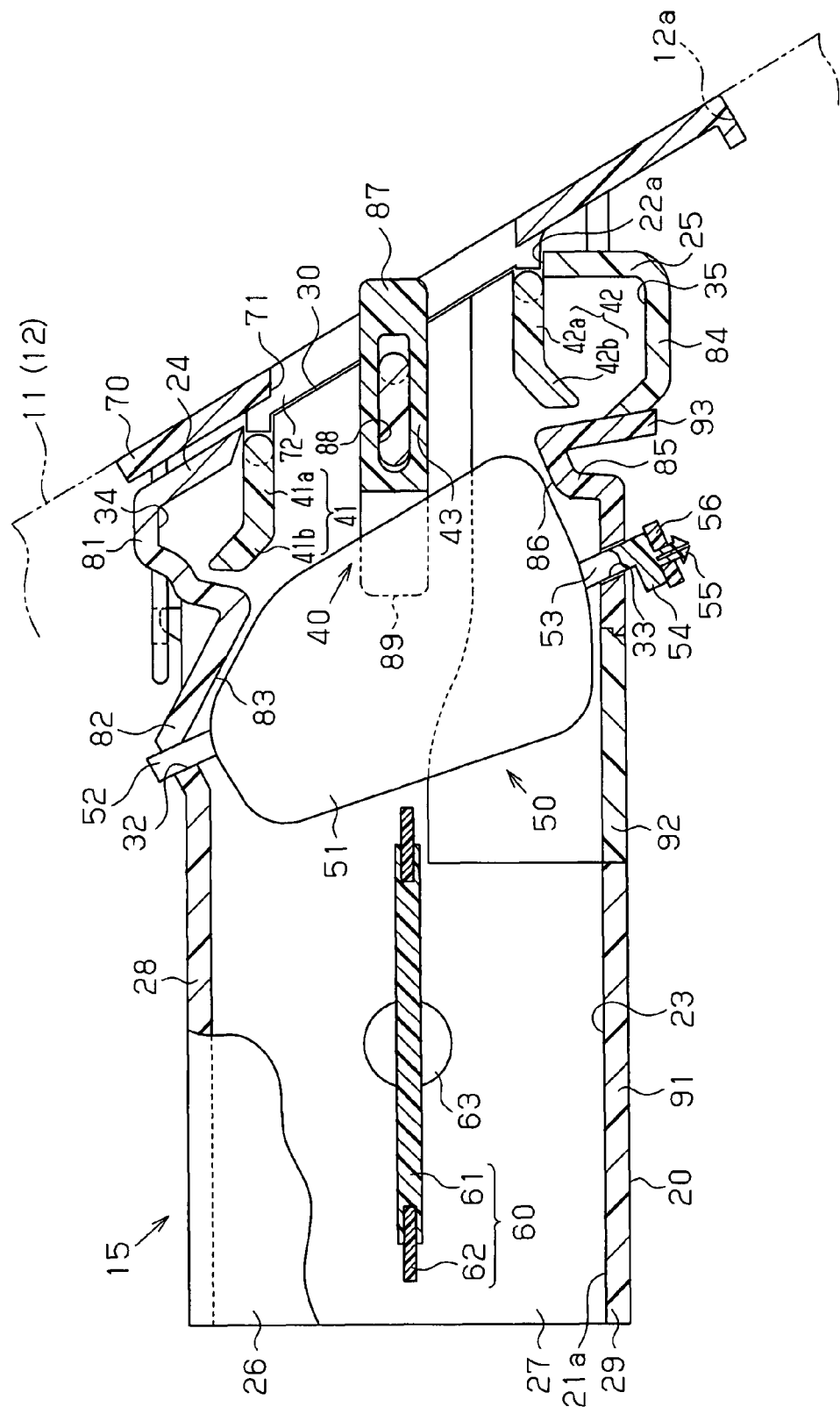
FIG. 8 is a cross-sectional view showing an air conditioning register in accordance with a second embodiment of the present invention.
Figure 9:
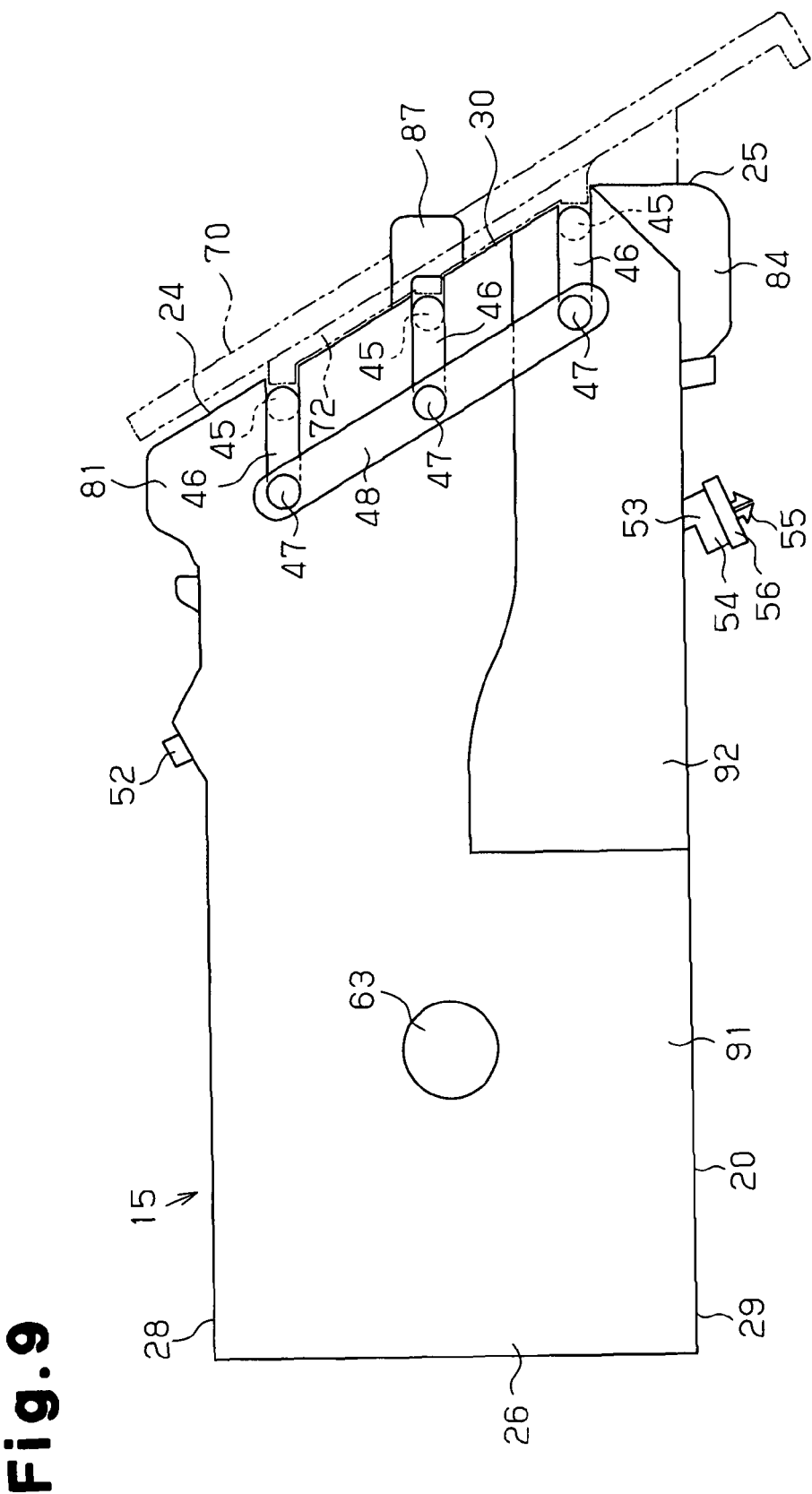
FIG. 9 is a side elevational view showing a state in which a cover is detached from the air conditioning register.

In the second embodiment, as shown in FIGS. 8 and 9, the interval between the extension portion 41b of the end fin 41 and the second wall portion 28 becomes narrower toward the upstream side from the end portion of the main body portion 41a of the end fin 41. In other words, the extension portion 41b of the end fin 41 is inclined at a predetermined angle with respect to the main body portion 41a in such a manner as to become higher toward the upstream end. Further, the interval between the extension portion 42b of the end fin 42 and the second wall portion 29 becomes narrower toward the further upstream side from the upstream end of the main body portion 42a of the end fin 42. In other words, the extension portion 42b of the end fin 42 is inclined at a predetermined angle with respect to the main body portion 42a in such a manner as to become lower toward the upstream side. Accordingly, the inclination of the extension portion 42b has an inverse relation to the inclination of the extension portion 41b.

Further, a bulge portion 81 bulging toward an upper side corresponding to the outer side of the ventilation passage 23 is formed in the downstream end of the second wall portion 28. The bulging amount of the bulge portion 81 is smaller than the bulging amount of the bulge portion 75 in the first embodiment. Further, a protruding portion 82 protruding downward toward the center of the ventilation passage 23 is formed in an upstream side of the bulge portion 81 in the second wall portion 28. The protruding portion 82 has a surface approaching the center of the ventilation passage 23 toward the downstream end, that is, an inclined surface 83 which becomes lower toward the downstream end. Accordingly, the air flowing through the upper portion of the ventilation passage 23 is introduced diagonally downward toward the center of the ventilation passage 23, by the inclined surface 83 of the protruding portion 82 in the process of passing through the protruding portion 82. The space 34 is formed in the downstream side of the protruding portion 82, near the second wall portion 28 in the ventilation passage 23. In other words, an internal space of the bulge portion 81 corresponds to the space 34.

A bulge portion 84 bulging toward the lower side corresponding to the outer side of the ventilation passage 23 is formed in the downstream end of the second wall portion 29. The bulging amount of the bulge portion 84 is smaller than the bulging amount of the bulge portion 76 in the first embodiment. Further, a protruding portion 85 protruding upward toward the center of the ventilation passage 23 is formed in an upstream side of the bulge portion 84 in the second wall portion 29. The protruding portion 85 has a surface approaching the center of the ventilation passage 23 toward the downstream end, that is, an inclined surface 86 which becomes higher toward the downstream end. Accordingly, the air flowing through the lower portion of the ventilation passage 23 is introduced diagonally upward toward the center of the ventilation passage 23, by the inclined surface 86 of the protruding portion 85 in the process of passing through the protruding portion 85. The space 35 is formed in the downstream side of the protruding portion 85, near the second wall portion 29 in the ventilation passage 23. In other words, an internal space of the bulge portion 84 corresponds to the space 35.

In the second embodiment, each of the second wall portions 28 and 29 are protruded toward the center of the ventilation passage 23. Accordingly, the shape of each of the upstream side fins 51 is changed to such a shape as to be prevented from interfering with each of the protruding portions 82 and 85.

A movable operation knob 87 is installed in place of the operation knob 44 in the intermediate fin 43 so as to be slidable along the long side B of the opening 22a. In the second embodiment, the movable operation knob 87 is provided with a through hole 88 extending along the long side B of the opening 22a. The intermediate fin 43 is inserted to the through hole 88. A bifurcated portion 89 which has sections separated from each other along the long side B of the opening 22a is formed in an end portion in an upstream side of the movable operation knob 87. The upstream side fin 51 positioned in an intermediate in the arranging direction, that is, the vehicle width direction in the upstream side fin group 50 is coupled by inserting the downstream side portion thereof to the bifurcated portion 89. Further, the arm 54, the coupling protrusion 55 and the coupling rod 56 for coupling each of the upstream side fins 51 are provided in the lower side of the upstream side fin 51.

Accordingly, if the movable operation knob 87 is slid along the intermediate fin 43, the specific upstream side fin 51 coupled to the bifurcated portion 89 is tilted along the long side B of the opening 22a around each of the support shafts 52 and 53. This motion is transmitted to all the other upstream side fins 51 via the coupling protrusion 55, the arm 54 and the coupling rod 56. Accordingly, all the upstream side fins 51 are synchronously tilted. The air flows along the tilted upstream side fin 51 at a time of passing through the upstream side fin group 50, and is changed its direction so as to be blown from the opening 71.

Taking the assembling work of the upstream side fin 51 with respect to the retainer 20 into consideration, the retainer 20 is divided into a plurality of members. The retainer 20 is divided into a main body portion 91 corresponding to a main portion, a portion 92 constructing a lower portion in the downstream side of the retainer 20, and a bearing portion 93 supporting the support shaft 53 in the lower side of the upstream side fin 51.

Next, a description will be given of an operation of the air conditioning register 15 in accordance with the second embodiment.

FIGS. 8 and 9 show a state in which the intermediate fin 43 is arranged in parallel to the second wall portions 28 and 29. The air flowing through the intermediate portion in the height direction in the ventilation passage 23 flows along the intermediate fin 43, and is blown off straight from the opening 71.

The main body portion 41a of the end fin 41 is parallel to the intermediate fin 43. At this time, the extension portion 41b has entered the space 34, and is close to an inner wall surface of the protruding portion 82. Accordingly, the air flowing through the upper portion of the ventilation passage 23 is introduced diagonally downward by the inclined surface 83 of the protruding portion 82, and is thereafter introduced diagonally downward by the extension portion 41b while hardly flowing into the space 34. Thereafter, the air flows along the main body portion 41a, and is blown off straight from the opening 71.

The main body portion 42a of the end fin 42 is also parallel to the intermediate fin 43. Further, the extension portion 42b has entered the space 35, and is close to an inner wall surface of the protruding portion 85. Accordingly, the air flowing through the lower portion of the ventilation passage 23 is introduced diagonally upward by the inclined surface 86 of the protruding portion 85, and is thereafter introduced diagonally upward by the extension portion 42b while hardly flowing into the space 35. Thereafter, the air flows along the main body portion 42a, and is blown off straight from the opening 71.

Figure 10:
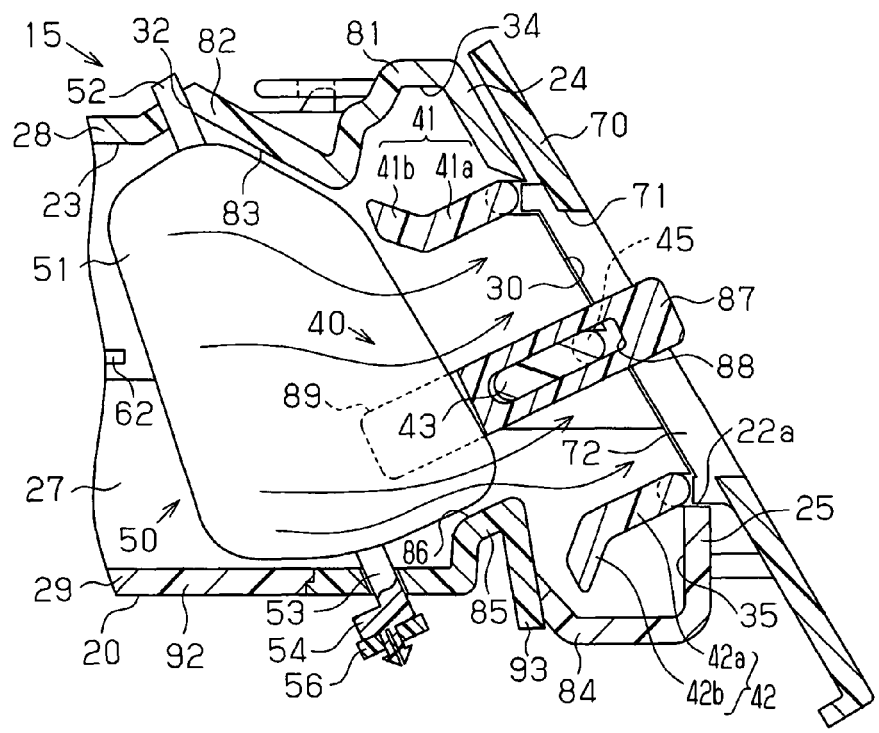
FIG. 10 is a partial side cross-sectional view showing the air conditioning register at a time of operating a movable operation knob upward.

FIG. 10 shows a state in which the intermediate fin 43 is rotated in a counterclockwise direction around the support shaft 45 from the state in FIG. 8. In this state, the intermediate fin 43 is inclined so as to become higher toward the downstream end. Accordingly, the air flowing through the intermediate portion in the height direction in the ventilation passage 23 flows along the intermediate fin 43, and is blown off diagonally upward from the opening 71.

The main body portion 41a of the end fin 41 is parallel to the intermediate fin 43. At this time, the upper end portion of the extension portion 41b is positioned in the boundary portion between the space 34 and the ventilation passage 23, and the space 34 is closed by the extension portion 41b. Accordingly, the air flowing through the upper portion of the ventilation passage 23 is introduced diagonally downward toward the center of the ventilation passage 23 by the inclined surface 83 of the protruding portion 82. Next, the air is introduced diagonally downward by the extension portion 41b while hardly flowing into the space 34. Further, the air flows along the main body portion 41a, and is blown off diagonally upward from the opening 71.

The main body portion 42a of the end fin 42 is in parallel to the intermediate fin 43. At this time, the lower end portion of the extension portion 42b has gotten deep into the space 35. Accordingly, the air flowing through the lower portion of the ventilation passage 23 is introduced diagonally upward by the inclined surface 86 of the protruding portion 85, flows along the extension portion 42b and the main body portion 42a while hardly flowing into the space 35, and is blown off diagonally upward from the opening 71.

Figure 11:
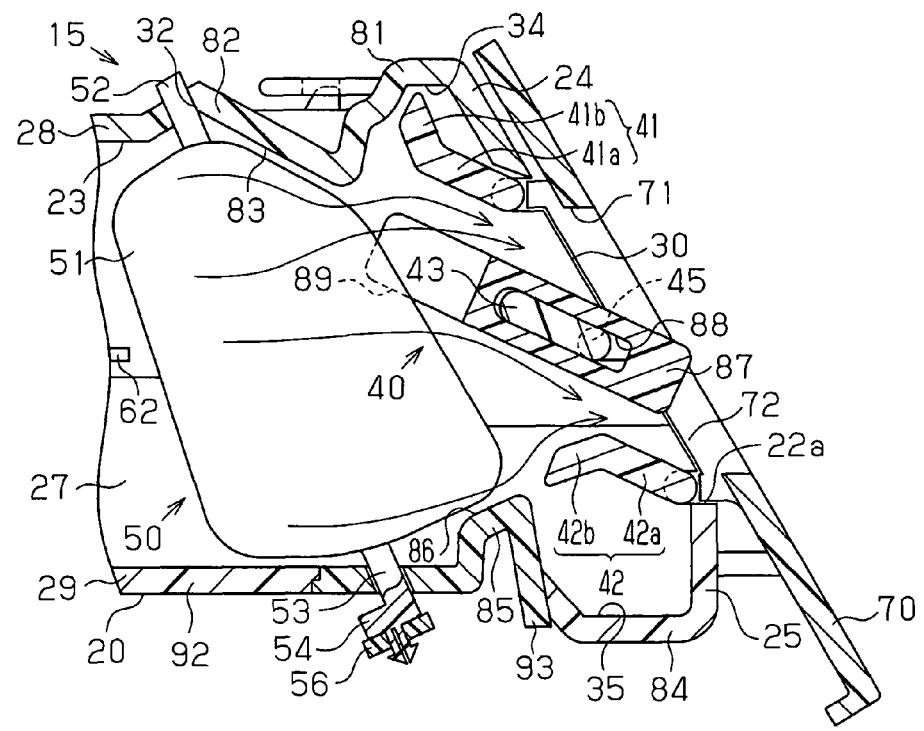
FIG. 11 is a partial side cross-sectional view showing the air conditioning register at a time of operating the movable operation knob downward.
Figure 12:
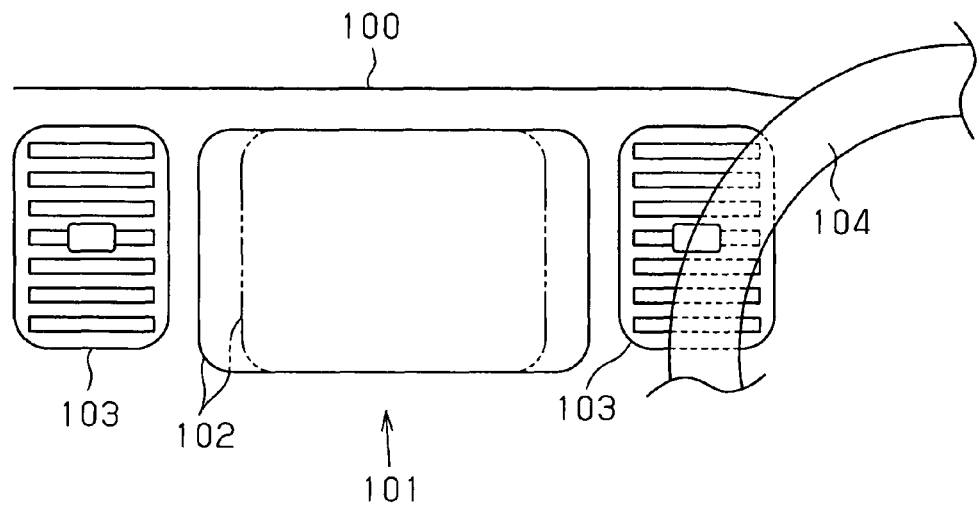
FIG. 12 is a partial front elevational view showing a center cluster in which a conventional air conditioning register is incorporated and a peripheral structure of the same.
Figure 13:
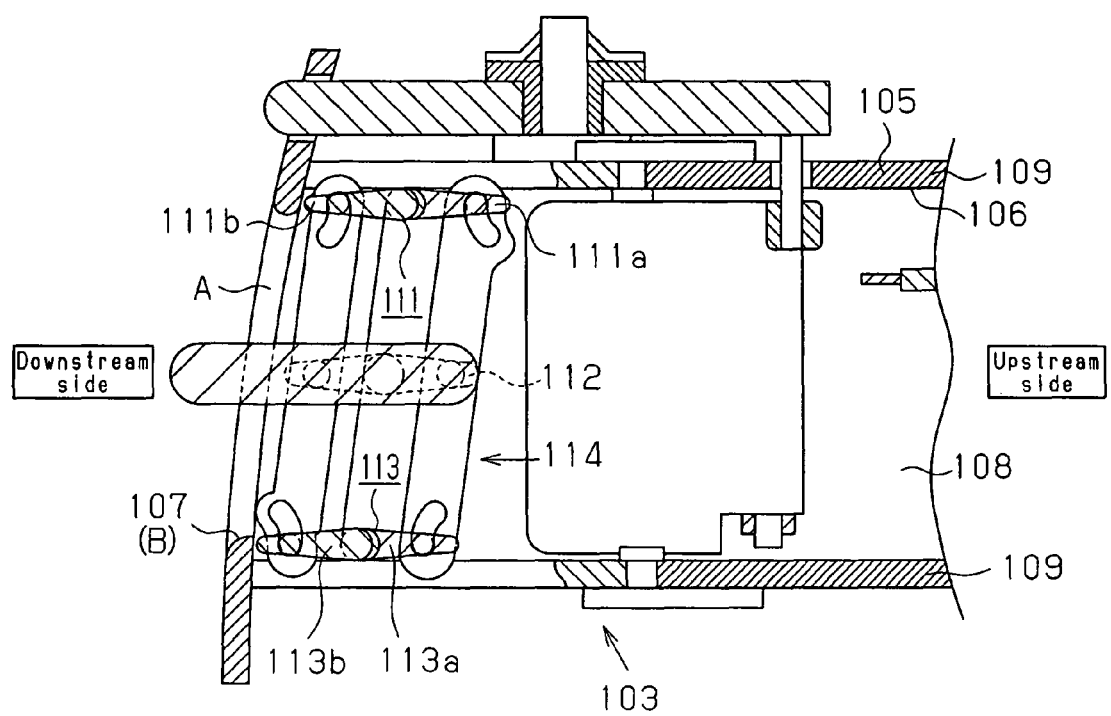
FIG. 13 is a partial side cross-sectional view showing an internal structure of the conventional air conditioning register.

FIG. 11 shows a state in which the intermediate fin 43 is rotated in a clockwise direction around the support shaft 45 from the state in FIG. 8. In this state, the intermediate fin 43 is inclined in such a manner as to become lower toward the downstream end. Accordingly, the air flowing through the intermediate portion in the height direction in the ventilation passage 23 flows along the intermediate fin 43, and is blown off diagonally downward from the opening 71.

The main body portion 41a of the end fin 41 is parallel to the intermediate fin 43. At this time, the upper end portion of the extension portion 41b has gotten deep into the space 34. Accordingly, the air flowing through the upper portion of the ventilation passage 23 is introduced diagonally downward by the inclined surface 83 of the protruding portion 82. Thereafter, the air flows along the main body portion 41a while hardly flowing into the space 34, and is blown off diagonally downward from the opening 71.

The main body portion 42a of the end fin 42 is also parallel to the intermediate fin 43. Further, the lower end portion of the extension portion 42b is positioned in the boundary portion of the space 35 with the ventilation passage 23, and the space 35 is closed by the extension portion 42b. Accordingly, the air flowing through the lower portion of the ventilation passage 23 is introduced diagonally upward by the inclined surface 86 of the protruding portion 85, thereafter flows along the extension portion 42b and the main body portion 42a while hardly flowing into the space 35, and is blown off diagonally downward from the opening 71.

Accordingly, the same advantages as those of the first embodiment can be obtained by the second embodiment.

The present invention may be embodied as shown below.

In the second embodiment, the respective spaces 34 and 35 may be formed by protruding the downstream ends of the second wall portions 28 and 29 further toward the center of the ventilation passage 23 than the other portions without bulging to the outer side of the ventilation passage 23.

The opening 71 of the air conditioning register in accordance with the present invention may vertically long. In this case, in the retainer 20, the wall portions opposing each other along the vertical direction correspond to the first wall portions 26 and 27, the wall portions opposing each other along the vehicle width direction correspond to the second wall portions 28 and 29, and each of the end fins 41 and 42 and the intermediate fin 43 are arranged along the vehicle width direction.

In the opening 71 of the cover 70 corresponding to the air outlet of the air conditioning register 15, at least one of the height H and the width W may be set to a value different from the first embodiment (H: 30 mm, W: 120 mm).

The present invention may be applied to an air conditioning register provided with a plurality of intermediate fins 43 between the end fins 41 and 42.

The damper 60 and the upstream side fin 51 which are not directly related to the feature portion of the present invention may be omitted, or the shape and the number of them may be changed.

The invention claimed is:

1. An air conditioning register for regulating a direction of an air blown from an air conditioner into a passenger compartment of a vehicle, comprising:
   a tubular retainer;
   a ventilation passage provided within the retainer, the ventilation passage circulating the air; and
   a rectangular opening provided in a downstream end of the retainer for blowing off the air,
   wherein the retainer is constituted by four wall portions surrounding the ventilation passage,
   wherein two of the wall portions that correspond to short sides of the opening form first wall portions, and the other two wall portions that correspond to long sides of the opening form second wall portions,
   wherein at least three plate-like fins are provided within the retainer and extend along the long sides of the opening,
   wherein the fins are arranged along the short sides of the opening and away from each other,
   wherein the fins are provided with a plurality of support shafts, respectively, each support shaft supporting the corresponding fin so that the fins are tiltable about the corresponding support shafts,
   wherein the fins include two end fins, which are adjacent to the second wall portions, respectively,
   wherein each of the end fins has rigidly attached an extension portion, which is bent at an upstream end of the end fin and extends toward the corresponding second wall portion,
   wherein a space is provided near each second wall portion in the ventilation passage, the space being closed by the corresponding extension portion when the corresponding end fin is arranged at a maximum inclined position at which the upstream end of the corresponding end fin is most separated from the second wall portion, and wherein the extension portion enters the space when the end fin is arranged at a position different from the maximum inclined position,
   wherein a downstream end of the corresponding second wall portion protrudes toward a center of the ventilation passage to form each of the spaces,
   wherein an upstream side fin is provided in the retainer at a position upstream of the downstream side fins, and
   wherein the upstream side fin is located upstream of the protruded portion of the second wall portion and extends in a direction differing from the direction in which the downstream side fins extend.

2. The air conditioning register according to claim 1, wherein the fins include one intermediate fin arranged in an intermediate position between the end fins.

3. The air conditioning register according to claim 1, wherein the second wall portions are not moved by the movement of each of the end fins.

4. The air conditioning register according to claim 1, wherein each support shaft is provided in a downstream end in the corresponding fin.

5. The air conditioning register according to claim 4, further comprising a cover having an opening which is smaller than the opening of the retainer, wherein the cover is installed to the retainer from a downstream side thereof.

* * * * *